United States Patent Office 3,433,997
Patented Mar. 18, 1969

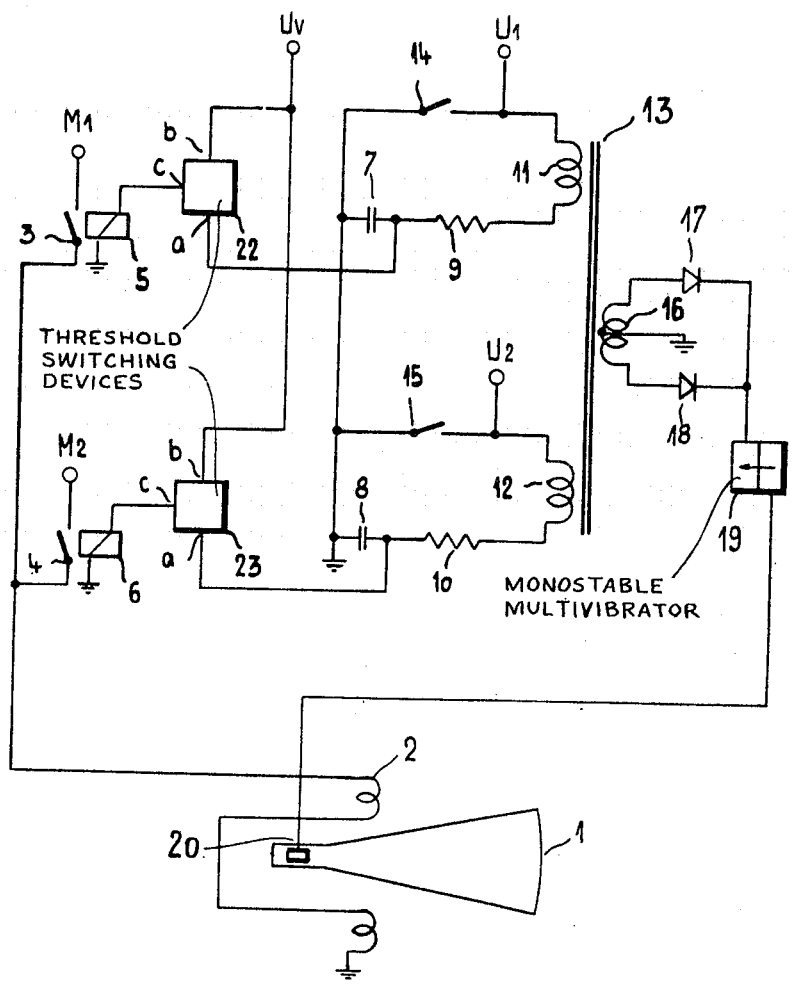

3,433,997
CIRCUIT ARRANGEMENT FOR SUPPRESSING THE INTENSITY OF AN INDICATOR TUBE
Werner Bidese, Zurich, Switzerland, assignor to Albiswerk Zurich A.G., Zurich, Switzerland, a corporation of Switzerland
Filed Mar. 22, 1968, Ser. No. 715,401
Claims priority, application Switzerland, Apr. 5, 1967, 4,803/67
U.S. Cl. 315—22      3 Claims
Int. Cl. H01j 29/70, 29/52

ABSTRACT OF THE DISCLOSURE

A circuit arrangement for suppressing the intensity of an indicator tube during the switching-in and switching-out of measurement signals applied to the tube. A switching relay arrangement is provided for each measurement signal, the relay arrangement responding to the output of a switching stage having a threshold defined by a comparison voltage. The threshold switching stage is responsive to the voltage associated with an RC time-delay network which is selectively charged and discharged by a voltage source which can be effectively short-circuited by a selector switch. The charging and discharging current in the RC time-delay network generates a pulse which, through the effect of a transformer-rectifier arrangement and a monostable multi-vibrator, suppresses the brightness of the indicator tube.

Background of the invention

The present invention relates to an improved circuit arrangement for suppressing the intensity or brightness of an indicator tube such as a cathode ray tube during the switching-in and switching-out of measurement signals which can be electrically coupled to the deflection system of the tube through separate relays associated with each of the measurement signals.

In a radar device, for example, the obtained information, depending upon its intended use, is displayed in different ways at an indicator tube. It is for this reason that the tube inputs for the horizontal and vertical deflection as well as for the brightness or intensity control are arranged so that they can be switched to different signal sources. When switching from one manner of representation to another, however, the electron beam travels along the screen of the tube in uncontrolled fashion from one point of one picture to one point of the following picture. The trace or pattern which is thus produced upon the screen, particularly a screen having long persistance times, disturbs the evaluation of the represented picture or image.

Summary of the invention

Accordingly, a primary object of the present invention is to provide an improved circuit arrangement for suppressing the intensity or brightness of an indicator tube during the switching-in and switching-out of measurement signals.

A further though equally important object of the subject invention is to provide a circuit arrangement wherein each switching command for the measurement signals directly effects a temporary blanking of the indicator tube.

Other objects of the subject invention relate to the provision of a circuit arrangement which performs the above functions yet which is:

(a) Relatively simple in construction;
(b) Highly reliable in operation;
(c) Readily adaptable to a large number of measurement signals.

Now, in order to implement these and still further objects of the invention, which will become more readily apparent as the description proceeds, the inventive circuit arrangement is generally manifested by the structural features that a switching relay is provided for each measurement signal, the excitation portion or winding of each relay being connected to a switching stage provided with a switching threshold which is defined by a comparison voltage. Furthermore, the input of each switching stage is electrically coupled with a grounded charging capacitor. This charging capacitor is coupled via a resistor and a primary winding of a transformer which is common to all relay circuits with a voltage source which can be short-circuited by a contact of a selector switch. Additionally, both output terminals of the secondary winding of the common transformer are electrically coupled via similarly poled rectifier paths to the input of a monostable multivibrator which serves to control the brightness or intensity of the indicator tube.

The portrayal or representation of disturbing traces, which may result from switching effects, is prevented by the inventive circuit or switching arrangement in that one switching command for the measurement signals directly blanks the indicator tube, whereas there occurs a delayed switching-in or switching-out of the measurement signals.

Brief description of the drawing

The invention will be better understood, and objects and features other than those set forth above, will become apparent, when consideration is given to the following detailed description thereof. Such description makes reference to the annexed drawing wherein the single figure shows a preferred embodiment of circuitry for suppressing the brightness or intensity of an indicator tube.

Description of the preferred embodiment

Referring now to the drawing, the single figure shows a preferred embodiment of a switching or circuit arrangement for the selective switching-in and switching-out of two measurement signals at the deflection system of an indicator tube such as a cathode ray tube.

More precisely, the illustrated switching or circuit arrangement is composed of two identical relay-delay circuits which are associated with both of the measurement signals M1 and M2 which are to be switched through and applied to the tube. Each of these relay-delay circuits embodies a respective RC-member and a respective electromagnetic relay 5 and 6 having contacts 3 and 4, respectively, and excitation portions or windings as shown. Relays 5 and 6 can be actuated via an electronic switching stage 22 and 23, respectively. Each respective RC-member is formed of a respective charging capacitor 7 and 8 and a series-connected resistor 9 and 10, respectively. Each resistor 9 and 10 is electrically coupled via a respective primary winding 11 and 12 of a transformer 13 which is common to all delay circuits with a separate voltage source U1 and U2, respectively. These voltage sources U1 and U2 can be short-circuited by the contacts 14 and 15, respectively, of a suitable selector switch means which has not been shown with any greater detail.

Continuing, it will be recognized that the input $a$ of a respective switching stage 22 and 23 is coupled with each charging capacitor 7 and 8, respectively. The switching stages 22 and 23 are pre-biased at their respective inputs $b$ by a comparison voltage $U_v$ provided by a suitable common voltage source. At the output $c$ of each switching stage 22 and 23, there is connected the electromagnetic relay 5 and 6, respectively, the respective contacts 3 and 4 of which switch through or couple the measurement signal M1 and M2, respectively, to the deflection system 2 of the indicator tube 1. Both of the terminals of the secondary winding 16 of the common transformer 13 having a grounded center tap, are coupled via similarly poled diodes 17 and 18 to the input of a monostable multivibrator 19. As shown, the output of this monostable multivibrator 19 is electrically coupled with a terminal 20 effecting the intensity control of the indicator tube 1.

The described switching arrangement functions as follows:

Each charging capacitor 7 and 8 of each relay-delay circuit, after opening the respective contacts 14 and 15, is charged to the voltage U1 and U2, respectively, via the respective primary winding 11 and 12 and the respective resistor 9 and 10. This voltage serves to block the associated switching stage 22 and 23 and the respective relay 5 and 6 is not energized. If now, for example, the measurement signal M1 is to be applied to the deflection system 2, then the contact 14 would be closed. Consequently, the capacitor 7 discharges in the form of an exponential function via the resistor 9, the primary winding 11 and the closed contact 14, to ground. The transformer 13 is dimensioned in such a manner that the discharge current surge produces a voltage pulse at the secondary of the transformer 13 practically without any time delay. The pulse which has been induced in one half of the secondary winding 16 is conducted via one of the diodes 17 or 18 to the monostable multivibrator 19. As a result, the monostable multivibrator 19 is switched into its unstable state, whereby a voltage is delivered to the indicator tube 1 via terminal 20 which blocks the cathode beam.

As soon as the voltage at the charging capacitor 7 has dropped, due to the exponential discharge thereof to a value which is less than the comparison voltage U$v$, then the switching stage 22 is made conductive and the relay 5 is energized. The measurement signal M1 is therefore applied to the deflection system 2. After a certain predetermined time the monostable multivibrator 19 would be switched back into its rest condition, so that the cathode beam of the indicator tube 1 is again released.

Now, if the measurement signal M1 is to be switched-off of the indicator tube 1 and the measurement signal M2 switched-on, then the contact 14 would be opened and the contact 15 would be closed. Upon opening of the contact 14, the associated capacitor 7 charges, in accordance with an exponential function, to the voltage U1 via the primary winding 11 and the resistor 9. Because of the charging current surge which has its largest change at the beginning, a voltage pulse is induced in the secondary winding 16. However, this induced pulse travels in the opposite direction with respect to the pulse appearing during closing of the contact 14. Since the transformer 13 is provided with two secondary winding portions, this pulse appears at the other half of the winding with the correct polarity. The suitably poled pulse is then conducted via the diode 17 or 18 to the monostable multivibrator 19. As a result, the monostable multivibrator 19 is switched into its unstable state, whereby the brightness or intensity of the indicator tube 1 again is suppressed. As soon as the voltage at the charging capacitor 7 has risen to a value, because of the exponentially increasing charge, which is greater than the comparison voltage U$v$, then the switching stage 22 is blocked and the relay 5 is deenergized. The measurement signal is therefore switched-out of the deflection system 2.

The closing of contact 15 of the selector switch means triggers the same function in the relay-delay circuit which is associated with the measurement signal M2 as that which has been described previously with regard to the contact 14.

The period of time in which the monostable multivibrator 19 remains in its unstable condition or state and therefore suppresses the brightness or intensity of the indicator tube 1 is chosen in such a manner that the switching functions of the relays take place within this period of time.

The selection of the pulse which is suitably poled for the control of the multivibrator 19 occurs, in the exemplary illustrated circuit arrangement, by means of both similarly poled diodes 17 and 18. Each one of these diodes 17 and 18 is coupled with one of the terminals of the secondary winding 16, the center tap of which is grounded. This arrangement has the advantage that the pulse delivered to the multivibrator 19 must only pass through one rectifier path.

However, it should be clearly understood that a rectifier arrangement, for instance in the form of the well-known Grätz rectifier circuit arrangement can be also used for the selection of a suitably poled pulse. The advantage of this arrangement resides in the fact that in order to supply a Grätz circuit, the transformer 13 must only be equipped with a single secondary winding. The Grätz circuit is coupled in such a manner to the secondary winding of the transformer 13 that a suitably poled pulse always appears at the conductor or lead connected with the multivibrator 19.

Furthermore, it should be appreciated that the number of connectable measurement signals is virtually unlimited. For each additional measurement signal there should be provided a further relay-delay circuit as shown as well as a further primary winding for the transformer 13.

What is claimed is:

1. A circuit arrangement for suppressing the intensity of an indicator tube during the switching-in and switching-out of measurement signals which are connected to the deflection system of the indicator tube via separate relays each having a contact and an excitation portion associated therewith, said circuit arrangement comprising: a switching stage means for each relay provided with a switching threshold defined by a comparison voltage and having an input and an output; means for coupling said excitation portion of each relay to said output of the associated switching stage means; a common transformer having at least one primary winding and a secondary winding; a grounded charging capacitor and a resistor provided for each of said switching stage means, each said grounded charging capacitor and resistor being coupled via a primary winding of said common transformer with a voltage source; means for coupling each grounded charging capacitor with said input of the associated switching stage means; selector swicth means having a contact for short-circuiting said voltage source; a monostable multivibrator means having an input, said monostable multivibrator means controlling the brightness of the indicator tube; and similarly poled rectifier means for connecting both terminals of said secondary winding of said common transformer to said input of said monostable multivibrator means.

2. A circuit arrangement as defined in claim 1, wherein said similarly poled rectifier means comprises a Grätz circuit arrangement.

3. A circuit arrangement as defined in claim 1, wherein said similarly poled rectifier means comprise two diodes each one of which is connected with a respective terminal of said secondary winding of said transformer, said secondary winding having a grounded center tap.

References Cited

UNITED STATES PATENTS 2,858,475   10/1958   Blake _____ 315—22 X

RODNEY D. BENNETT, Jr., *Primary Examiner.*

T. H. TUBBESING, *Assistant Examiner.*

U.S. Cl. X.R.

315—30